United States Patent
Park et al.

(10) Patent No.: US 9,948,172 B2
(45) Date of Patent: Apr. 17, 2018

(54) POWER CONVERTER FOR ELIMINATING RIPPLES

(71) Applicant: SOONGSIL UNIVERSITY RESEARCH CONSORTIUM TECHNO-PARK, Seoul (KR)

(72) Inventors: Joung Hu Park, Seoul (KR); Ahmed Ashraf, Seoul (KR)

(73) Assignee: SOONGSIL UNIVERSITY RESEARCH CONSORTIUM TECHNO-PARK, Seoul (KR)

(*) Notice: Subject to any disclaimer, the term of this patent is extended or adjusted under 35 U.S.C. 154(b) by 0 days.

(21) Appl. No.: 15/302,487

(22) PCT Filed: Apr. 8, 2015

(86) PCT No.: PCT/KR2015/003513
§ 371 (c)(1),
(2) Date: Oct. 6, 2016

(87) PCT Pub. No.: WO2015/156597
PCT Pub. Date: Oct. 15, 2015

(65) Prior Publication Data
US 2017/0033678 A1    Feb. 2, 2017

(30) Foreign Application Priority Data
Apr. 9, 2014 (KR) .................. 10-2014-0042352

(51) Int. Cl.
H02M 1/15    (2006.01)
H02M 5/458   (2006.01)
(Continued)

(52) U.S. Cl.
CPC .............. H02M 1/15 (2013.01); H02M 1/143 (2013.01); H02M 3/156 (2013.01); H02M 5/458 (2013.01);
(Continued)

(58) Field of Classification Search
CPC .......... G05F 1/56; H02M 1/143; H02M 1/14; H02M 1/12; H02M 3/155; H02M 7/44;
(Continued)

(56) References Cited

U.S. PATENT DOCUMENTS

| 6,081,104 A * | 6/2000 | Kern | ...................... H02J 9/065 |
| | | | 320/101 |
| 2004/0079953 A1* | 4/2004 | Mednik | ............... H02M 1/4208 |
| | | | 257/82 |

(Continued)

FOREIGN PATENT DOCUMENTS

| JP | 2011-061965 A | 3/2011 |
| JP | 2013-055794 A | 3/2013 |

(Continued)

OTHER PUBLICATIONS

International Search Report for PCT/KR2015/003513 dated Jul. 16, 2015 from Korean Intellectual Property Office.

(Continued)

Primary Examiner — Gustavo Rosario Benitez
(74) Attorney, Agent, or Firm — Revolution IP, PLLC

(57) ABSTRACT

A ripple-eliminating power converter includes a first voltage converter configured to output a first voltage by stepping up or down a DC voltage supplied from a battery cell; a second voltage converter configured to receive the first voltage outputted from the first voltage converter and output a second voltage by stepping up or down the first voltage; and a ripple-eliminating capacitor disposed between the first voltage converter and the second voltage converter to transfer a DC component of the first voltage to the second voltage converter by eliminating an AC component included in the first voltage.

4 Claims, 3 Drawing Sheets

(51) Int. Cl.
*H02M 1/14* (2006.01)
*H02M 3/156* (2006.01)
*H02M 1/00* (2006.01)
*H02M 7/48* (2007.01)

(52) U.S. Cl.
CPC ........ *H02M 7/48* (2013.01); *H02M 2001/007* (2013.01); *H02M 2001/0022* (2013.01)

(58) Field of Classification Search
CPC ........... H02M 1/42; H02M 2001/0074; H02M 2001/009; H02M 1/66; H02M 1/67; H02M 1/15; H02M 3/156; H02M 5/458; H02M 2001/0022; H02M 2001/007; H02M 7/48
See application file for complete search history.

(56) References Cited

U.S. PATENT DOCUMENTS

| | | | | |
|---|---|---|---|---|
| 2010/0141188 | A1* | 6/2010 | Kakebayashi | H02P 3/18 318/400.3 |
| 2010/0309692 | A1* | 12/2010 | Chisenga | H02J 3/383 363/37 |
| 2011/0026281 | A1* | 2/2011 | Chapman | H02J 3/38 363/65 |
| 2011/0298305 | A1* | 12/2011 | Chisenga | H02M 3/156 307/151 |
| 2014/0347896 | A1* | 11/2014 | Chung | H02M 5/458 363/34 |
| 2015/0162817 | A1* | 6/2015 | Lee | H02J 7/007 320/107 |

FOREIGN PATENT DOCUMENTS

| | | |
|---|---|---|
| KR | 10-2006-0094466 A | 8/2006 |
| KR | 10-2011-0029723 A | 3/2011 |
| KR | 10-2012-0032318 A | 4/2012 |

OTHER PUBLICATIONS

Hwa-Seok Lee et al., "High Efficiency two-stage Cascaded Converter with Energy Storage Device for Renewable Energy Sources", IEEE, 2013, pp. 520-523.

* cited by examiner (a)

(b)

[Figure 2]
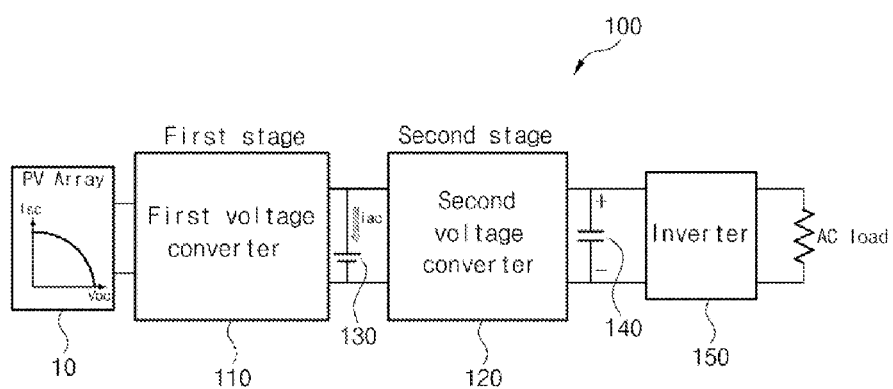
[Figure 3]
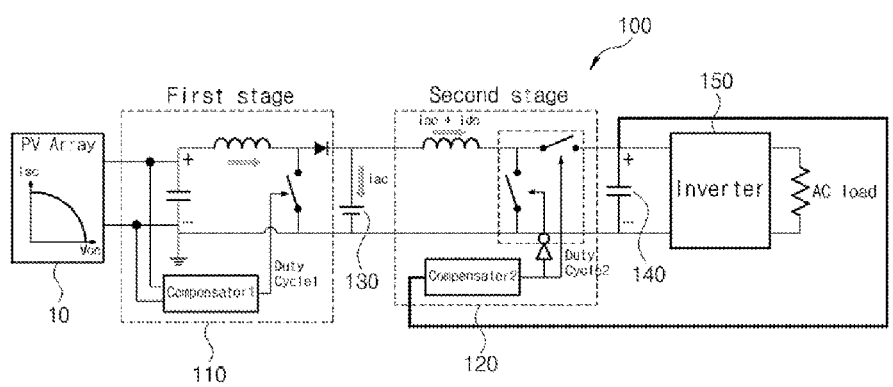

[Figure 4]
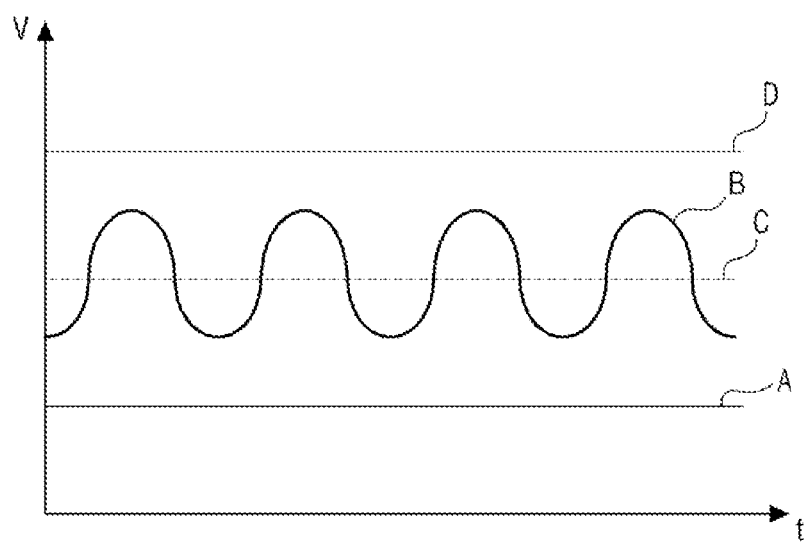

POWER CONVERTER FOR ELIMINATING RIPPLES

CROSS REFERENCE TO PRIOR APPLICATIONS

This application is a National Stage Application of PCT International Patent Application No. PCT/KR2015/003513 filed on Apr. 8, 2015, under 35 U.S.C. § 371, which claims priority to Korean Patent Application No. 10-2014-0042352 filed on Apr. 9, 2014, which are all hereby incorporated by reference in their entirety.

TECHNICAL FIELD

The present invention relates to a power converter for eliminating ripples, and more particularly, to an electrolytic-less capacitor-type power converter capable of improving power converting efficiency, lifespan, and reliability.

BACKGROUND ART

Today, renewable energy sources including solar cells are attracting attention as alternative energy, in that they do not use fossil fuels that restrictively exist in the Earth and can minimize environmental pollution. However, the renewable energy sources have voltages and currents that are unstable, and thus it is difficult to supply a stable power to loads. Accordingly, a technique has currently been being developed to stabilize power output of a system by using an energy storage device such as a battery.

A conventional renewable electric generator system has a structure in which a power is supplied from a DC battery power source to loads by connecting a power converter thereto.

Typically, ripples are generated in a DC voltage when power conversion is performed by stepping up or down the DC battery power to a desired voltage level. Conventionally, a high-capacity electrolytic capacitor was used to eliminate the ripples of the DC voltage. However, the electrolytic capacitor has a high capacity and short lifespan.

FIG. 1 illustrates an example of an electrolytic-less capacitor type ripple-eliminating circuit of a power converter according to a related art. FIG. 1(a) illustrates a configuration in which a ripple-eliminating circuit (relating to a ripple port) is connected in parallel (shunt) with a power-converting circuit, and FIG. 1(b) illustrates a configuration in which a ripple-eliminating circuit is expanded from two ports to three ports to be connected by adding windings in a transformer-type ripple-eliminating circuit.

The reason that an electrolytic-less capacitor type ripple-eliminating circuit is used will be described as follows. In order to output an AC output, i.e., an AC current, the AC current passes through an intermediate portion of the circuit, and thus a voltage of a capacitor positioned in the center significantly fluctuates. A high-capacity electrolytic capacitor is conventionally employed in a ripple-eliminating circuit to suppress such fluctuation. However, using the high-capacity electrolytic capacitor causes an increased price, reduced reliability, and a very high boosting ratio, thereby deteriorating power-converting efficiency.

A background technique of the present invention has been disclosed in Korea Patent Laid-Open Publication No. 2006-0094466 (Aug. 28, 2006)

DISCLOSURE

Technical Problem

The present invention has been made in an effort to provide a ripple-eliminating power converter capable of eliminating ripples without using an electrolytic capacitor.

Technical Solution

An exemplary embodiment of the present invention provides a ripple-eliminating power converter, including: a first voltage converter configured to output a first voltage by stepping up or down a DC voltage supplied from a battery cell; a second voltage converter configured to receive the first voltage outputted from the first voltage converter and output a second voltage by stepping up or down the first voltage; and a ripple-eliminating capacitor disposed between the first voltage converter and the second voltage converter to transfer a DC component of the first voltage to the second voltage converter by eliminating an AC component included in the first voltage.

Herein, the ripple-eliminating power converter may further include an inverter-inputting capacitor disposed at a rear stage of the second voltage converter to charge the second voltage outputted from the second voltage converter and supply it to an external load.

The first voltage converter and the second voltage converter can be formed as two stages of step-up/step-up converters or two stages of step-down/step-down converters, and may be connected to each other in a cascade form.

The ripple-eliminating capacitor or the inverter-inputting capacitor may be a small-capacity capacitor having a capacitor of 200 uF or less.

The ripple-eliminating capacitor may have a first stage connected to a first output port of the first voltage converter and a first input port of the second voltage converter and a second terminal connected to a second output port of the first voltage converter and a second input port of the second voltage converter.

The load may be an AC load, the power converter may further include an inverter connected between the inverter-inputting capacitor and the AC load to convert the second voltage into an AC voltage, and the inverter-inputting capacitor may have a first stage connected to the first output port of the second voltage converter and a first terminal of the inverter and a second terminal connected to the second output port of the second voltage converter and a second stage of the inverter.

Advantageous Effects

The ripple-eliminating power converter according to the exemplary embodiment of the present invention can effectively eliminate ripples caused by an AC current without any using a high-capacity electrolytic capacitor by connecting a small capacity of capacitor between two stages of voltage converters connected with each other in a cascade form, and can increase lifespan.

Further, it is possible to provide higher-efficiency power conversion efficiency by applying a two-stage voltage converter structure with step-up/step-up or step-down/step-down converters.

DESCRIPTION OF THE DRAWINGS

FIG. 2 is a schematic view illustrating a power converter for eliminating ripples according to an exemplary embodiment of the present invention.

FIG. 3 illustrates an example of a detailed configuration of the power converter of FIG. 2.

FIG. 4 is a graph illustrating a voltage variation of each stage in FIG. 3.

MODE FOR INVENTION

Figure 1:
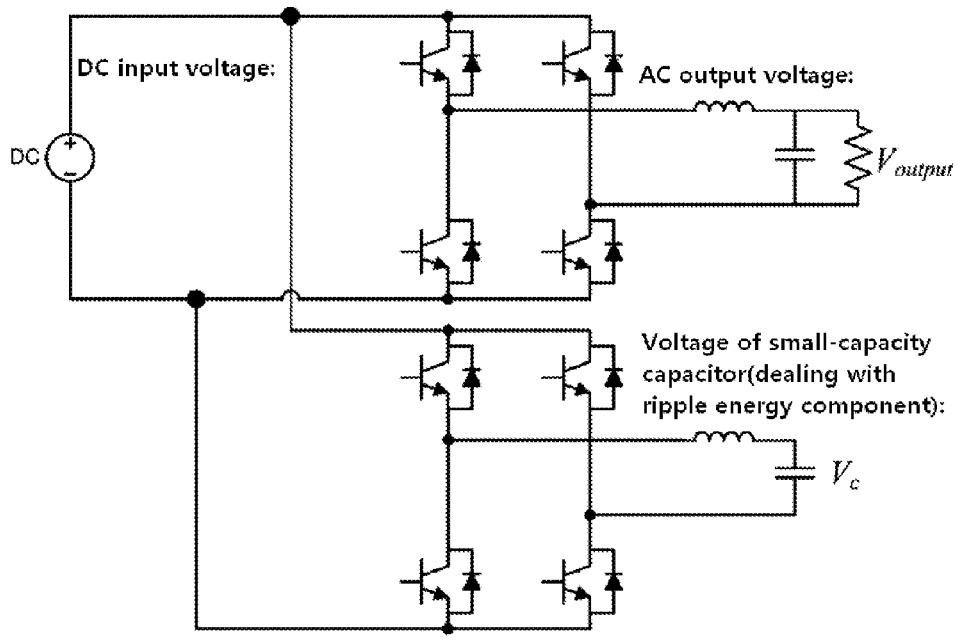
FIG. 1 illustrating an example of a ripple-eliminating circuit of a power converter according to a related art.
Figure 1:
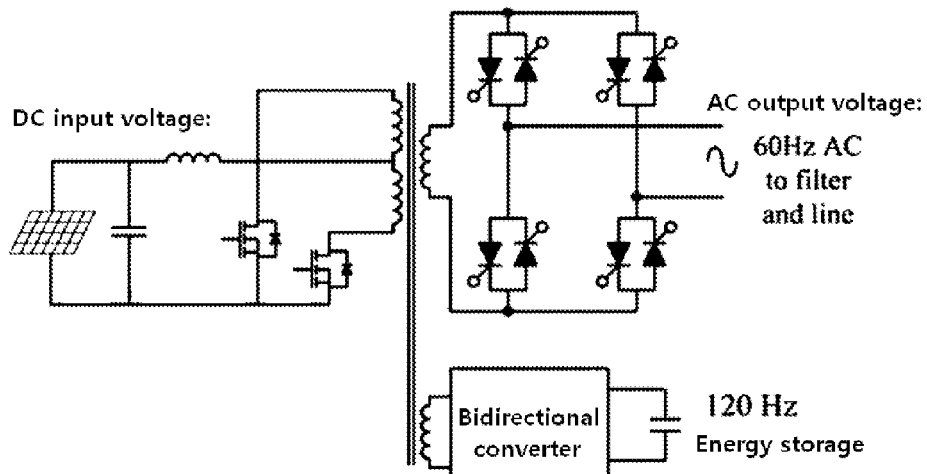

The present invention will be described more fully hereinafter with reference to the accompanying drawings, in which exemplary embodiments of the invention are shown.

FIG. 2 is a schematic view illustrating a power converter for eliminating ripples according to an exemplary embodiment of the present invention. Referring to FIG. 2, a ripple-eliminating power converter 100 according to the exemplary embodiment of the present invention includes a first voltage converter 110, a second voltage converter 120, a ripple-eliminating capacitor 130, an inverter-inputting capacitor 140, and an inverter 150.

In the present exemplary embodiment, the power converter may correspond to an AC-connected (AC-output) power converter. Herein, the AC-connected (AC-output) type comprehensively indicates an AC current output for motor control or a grid-connected renewable energy distributed generation source.

First, the first voltage converter 110 serves to output a first voltage by stepping up or down a DC voltage supplied from a battery cell 10. Herein, the battery cell 10 may correspond to a battery, a LED, a solar cell, a fuel cell, or the like, or a renewable energy current source including a wind force or a solar cell may be connected to the battery cell 10.

For example, the first voltage converter 110 may receive the DC voltage supplied from the battery cell 10, and may step up it to a first voltage level to output it. In general, in the step-up operation, a DC component and an AC component are mixed in the first voltage.

The second voltage converter 120 is connected to a rear stage of the first voltage converter 110 in a cascade form. The second voltage converter 120 receives the first voltage outputted from the first voltage converter 110 and outputs a second voltage by stepping up or down the received first voltage.

The first voltage converter 110 and the second voltage converter 120 may be formed to include two stages of step-up/step-up converters or two stages of step-down/step-down converters, and thus may be realized as high-efficiency step-up or step-down converters.

In order to improve step-up (or step-down) efficiency of the power converter 100, it is required to eliminate the AC component in advance between the first voltage converter 110 which is a front stage and the second voltage converter 120 which is a rear stage. That is, the AC component (ripple component) included in the first voltage needs to be eliminated in advance at a front stage of the second voltage converter 120.

For this purpose, in the exemplary embodiment of the present invention, a ripple-eliminating capacitor 130 is disposed between the first and second voltage converters 110 and 120. The ripple-eliminating capacitor 130 corresponds to a small-capacity capacitor having a capacitor of 200 uF or less.

The ripple-eliminating capacitor 130 serves to transfer the DC component of the first voltage to the second voltage converter 120 by absorbing the AC component $i_{ac}$ included in the first voltage. Accordingly, the second voltage converter 120 steps up or down the first voltage to output it as a DC-type second voltage.

A high DC voltage inverter-inputting capacitor 140 is disposed at a rear stage of the second voltage converter 120. The inverter-inputting capacitor 140 corresponds to a small-capacity capacitor having a capacitor of 200 uF or less instead of an electrolytic capacitor.

This inverter-inputting capacitor 140 serves to charge the second voltage outputted from the second voltage converter 120 to supply it to an external AC load. However, since it is required to supply an AC voltage to the AC load, an inverter 150 is connected between the inverter-inputting capacitor 140 and the AC load to change the DC-type second voltage charged to the inverter-inputting capacitor 140 into an AC-type voltage.

Accordingly, the inverter-inputting capacitor 140 has a first terminal that is connected to a first output port of the second voltage converter 120 and a first terminal of the inverter 150 and a second terminal that is a second output port of the second voltage converter 120 and a second terminal of the inverter 150.

Comparison of a structure of the power converter according to the exemplary embodiment of the present invention with the related art will be described as follows.

In the case of the power-converting circuit according to the related art as in FIG. 1, configurations in which the ripple-eliminating circuit is in parallel with the power-converting circuit and in which the ripple-eliminating circuit is expanded to three ports are illustrated.

According to these configurations, a high boosting ratio power converter needs to be used for charge and discharge of the ripple-eliminating capacitor, which causes poor efficiency, high circuit complexity, an increased price, and reduced lifespan.

However, according to the exemplary embodiment of the present invention, the two voltage converters 110 and 120 as a two-stage structure connected with each other in the cascade form are used, and thus it is not necessary to use the high boosting ratio power converter for charge and discharge of the ripple-eliminating capacitor. In addition, the AC current $i_{ac}$ can be naturally suppressed by simply disposing a small capacity of capacitor having long lifespan, and power-converting efficiency can be improved by supplying a ripple-eliminated DC voltage to the second voltage converter 120.

As described above, according to the present invention, ripples caused by the AC current can be efficiently reduced without using the high boosting ratio power converter differently from the conventional art, by connecting a small-capacity capacitor between two stages of voltage converters connected with each other in the cascade form, and this can increase lifespan.

FIG. 3 illustrates an example of a detailed configuration of the power converter of FIG. 2. The power converters shown in FIG. 2 may be realized in the form shown in FIG. 3. It shall be obvious that the present invention is not necessarily limited to the configuration of FIG. 3.

FIG. 3 is more specification of the configuration of the first and second converters 110 and 120 shown in FIG. 2. Hereinafter, for better comprehension and ease of description, two stages of step-up/step-up converters are illustrated as the first and second converters 110 and 120.

The first voltage converter 110 steps up a DC voltage outputted from the battery cell 10 by using a switch, and rectifies the stepped-up DC voltage through a diode to output it. In this case, a switch controller (compensator1)

adjusts a duty ratio (Duty Cycle1) by using an inputted DC voltage and controls the switch to be operated in the duty ratio. Herein, a level of the voltage to be stepped up may be increased by setting the duty ratio as a higher value.

Since even the diode rectification is not able to make complete rectification, there is the AC current $i_{ac}$ in a voltage component of the first voltage finally outputted to the first voltage converter 110 which is stepped up. Accordingly, the ripples are generated. Such ripples serve as a factor for fluctuating the voltage, and thus need to be offset before being inputted to the second voltage converter 120.

For this purpose, a ripple-eliminating capacitor 130 is connected between the first and second voltage converters 110 and 120. Specifically, a first terminal of the ripple-eliminating capacitor 130 is connected with a first output port of the first voltage converter 110 and a first input port of the second voltage converter 120, and a second terminal thereof is connected with a second output port of the first voltage converter 110 and a second input port of the second voltage converter 120.

By the action of the ripple-eliminating capacitor 130, the DC component obtained by eliminating the AC component is applied to the second voltage converter 120. When the ripple-eliminating capacitor 130 is not employed, the current ($i_{ac}+i_{dc}$) including the DC and AC components flows in an inductor included in the second voltage converter 120.

However, according to the present exemplary embodiment, most of the AC component $i_{ac}$ may be controlled to flow through the ripple-eliminating capacitor 130. Accordingly, the second voltage converter 120 can re-step up the DC voltage to output it.

As such, when the AC current is suppressed at an intermediate portion between the first stage converter and the second stage converter, the AC component disappears even in the inductor included in the first stage, and thus the DC component can be maintained. Further, the DC voltage of the battery cell 10 which is a front stage of the first stage can be constantly maintained.

Further, according to the present exemplary embodiment, the capacity of the ripple-eliminating capacitor 130 is small. Accordingly, although opposite-end voltage of the ripple-eliminating capacitor 130 significantly fluctuates, when a voltage difference between the DC voltage of the battery cell 10 and the voltage of the inverter-inputting capacitor 140 is sufficiently large, the power converter according to the present exemplary embodiment can be configured to include a high-efficiency step-up converter (e.g., a boosting converter) only. In other words, the voltage of the inverter-inputting capacitor 140 is very high. Accordingly, when a voltage difference between a solar light output terminal and the final stage is sufficiently large, the power converter according to the present exemplary embodiment can be configured to include the high-efficiency step-up converter only.

Next, the second voltage converter 120 includes a circuit for stepping up the inputted first voltage to a second voltage. The second voltage converter 120 steps up the first voltage by using the switch to output it. The switch controller (compensator2) adjusts a duty ratio (Duty Cycle2) by using the second voltage outputted to the converter and controls an internal switch to be operated in the duty ratio. Herein, a level of the voltage to be stepped up may be increased by setting the duty ratio as a higher value.

In the exemplary embodiment of the present invention, the configuration of the first and second voltage converters having functions for controlling the duty ratio and the switch is realized by using the well-known configuration, and a detailed description will be omitted. Further, an internal configuration of the converter may be more variously modified other than the illustration.

FIG. 4 is a graph illustrating a voltage variation of each stage in FIG. 3. When the DC inputted into the first voltage converter 110 is indicated by "A," the outputted voltage serves as a stepped-up voltage charged to a small capacity of electrolytic-less capacitor includes an AC component indicated by "B."

In views of the ripple-eliminating capacitor 130, the voltage of the ripple-eliminating capacitor 130 is not forcefully controlled in the DC form by the controllers (compensator 1 and 2), and thus an AC ripple component is gathered. Accordingly, a voltage measured between opposite terminals of the ripple-eliminating capacitor 130 has a same form as "B."

Alternatively, when a large capacity electrolytic capacitor is used instead of the ripple-eliminating capacitor 130, a voltage inputted into the second voltage converter 120 has a same form as C obtained by eliminating the AC component, and the second voltage converter 120 re-steps up the DC voltage C to output a same form as D.

However, a voltage deviation between the voltage A and the voltage D is large. Accordingly, when the voltage B acting as AC is confined within the deviation, the power converter can be configured by using a high-efficiency two-stage structure of step-up/step-up converters similarly to first and second voltage converter circuits when an electrolytic capacitor is used.

As described above, the ripple-eliminating power converter according to the exemplary embodiment of the present invention can effectively eliminate ripples caused by an AC current without any using a high-capacity electrolytic capacitor by connecting a small capacity of capacitor between two stages of voltage converters connected with each other in a cascade form, and can increase lifespan. Further, it is possible to provide higher-efficiency power conversion efficiency by applying a two-stage voltage converter structure with step-up/step-up or step-down/step-down converters.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A ripple-eliminating power converter, comprising:
   a first voltage converter configured to output a first voltage by stepping up or down a DC voltage supplied from a battery cell;
   a second voltage converter configured to receive the first voltage outputted from the first voltage converter and output a second voltage by stepping up or down the first voltage;
   a ripple-eliminating capacitor disposed between the first voltage converter and the second voltage converter to transfer a direct current (DC) component of the first voltage to the second voltage converter by absorbing an alternating current (AC) component of the first voltage, the AC component being a rippled component of the first voltage; and
   an input capacitor for an inverter disposed at a rear stage of the second voltage converter to charge the second voltage outputted from the second voltage converter and the charged second voltage being supplied to an external load through the inverter, wherein the ripple-eliminating capacitor and the input capacitor for an inverter is a small-capacity capacitor having a capacitance of 200 μF or less.

2. The power converter of claim 1, wherein the first voltage converter and the second voltage converter are formed as two stages of step-up/step-up converters or two stages of step-down/step-down converters, and are connected to each other in a cascade form.

3. The power converter of claim 1, wherein the ripple-eliminating capacitor has a first terminal connected to a first output port of the first voltage converter and a first input port of the second voltage converter and a second terminal connected to a second output port of the first voltage converter and a second input port of the second voltage converter.

4. The power converter of claim 3, wherein the load is an AC load, the power converter further comprises an inverter connected between the input capacitor for an inverter and the AC load to convert the second voltage into an AC voltage, and the inverter-inputting capacitor has a first terminal connected to the first output port of the second voltage converter and a first terminal of the inverter and a second terminal connected to the second output port of the second voltage converter and a second stage of the inverter.

* * * * *